United States Patent [19]
Takanabe et al.

[11] Patent Number: 5,703,780
[45] Date of Patent: Dec. 30, 1997

[54] NAVIGATION SYSTEM

[75] Inventors: Naoko Takanabe; Ichiro Tanaka, both of Hyogo, Japan

[73] Assignee: Mitsubishi Denki Kabushiki Kaisha, Tokyo, Japan

[21] Appl. No.: 503,509

[22] Filed: Jul. 18, 1995

[30] Foreign Application Priority Data

Jan. 20, 1995 [JP] Japan .................................. 7-007783

[51] Int. Cl.$^6$ ........................................ G06F 165/00
[52] U.S. Cl. ................. 364/449.3; 340/990; 340/995
[58] Field of Search ........................ 364/443, 444.1, 364/444.2, 449.1, 449.2, 449.3, 449.4, 449.5; 73/178 R; 340/988, 990, 995

[56] References Cited

U.S. PATENT DOCUMENTS

| | | | |
|---|---|---|---|
| 4,679,147 | 7/1987 | Tsujii et al. | 364/449.5 |
| 4,882,696 | 11/1989 | Nimura et al. | 364/449.5 |
| 5,043,902 | 8/1991 | Yokoyama et al. | 364/449.5 |
| 5,398,189 | 3/1995 | Inoue et al. | 364/449.2 |
| 5,410,486 | 4/1995 | Kishi et al. | 364/449.5 |
| 5,444,629 | 8/1995 | Kishi et al. | 364/443 |
| 5,539,397 | 7/1996 | Asanuma et al. | 364/449.2 |
| 5,546,311 | 8/1996 | Sekine | 364/449.2 |

FOREIGN PATENT DOCUMENTS

| | | |
|---|---|---|
| 0487280 | 5/1992 | European Pat. Off. . |
| 4141808 | 6/1993 | Germany . |
| 4324215 | 1/1994 | Germany . |
| 5141979 | 6/1993 | Japan . |
| 6281471 | 10/1994 | Japan . |

*Primary Examiner*—Gary Chin
*Attorney, Agent, or Firm*—Sughrue, Mion, Zinn, Macpeak & Seas, PLLC

[57] ABSTRACT

A navigation system comprises a vehicle position detecting unit for determining the present position of a vehicle from the amount of change in vehicle bearing and a distance traveled by the vehicle, a forward road data storage unit for reading a road existing ahead of the present vehicle position from a map data storage unit based on the present vehicle position detected by the vehicle position detecting unit and storing it therein as data, a change-in-road detecting unit for detecting a change-in-road section in which the orientation of the road greatly varies, from the stored forward road data and judging whether the change-in-road section exists within a range in which a notification is required, and a notification unit for notifying the present vehicle position to a driver and notifying a change-in-road section in which the notification has been judged necessary, to the driver.

14 Claims, 6 Drawing Sheets

| CODE No. | AMOUNT OF CHANGE IN X DIRECTION | AMOUNT OF CHANGE IN Y DIRECTION |
|---|---|---|
| 0 | $\ell$ | 0 |
| 1 | $\ell$ | $-\ell$ |
| 2 | 0 | $-\ell$ |
| 3 | $-\ell$ | $-\ell$ |
| 4 | $-\ell$ | 0 |
| 5 | $-\ell$ | $\ell$ |
| 6 | 0 | $\ell$ |
| 7 | $\ell$ | $\ell$ |

(UNIT LENGTH : $\ell$ )

NAVIGATION SYSTEM

BACKGROUND OF THE INVENTION

1. Field of the Invention

The present invention relates to a navigation system for searching a route between a departure position and a destination, detecting the present position of a vehicle and notifying the result of detection to a driver.

2. Description of the Related Art

As has been disclosed in Japanese Patent Laid-Open No. 2-166600, a conventional navigation system detects the present position of a vehicle with the navigation system mounted thereon based on bearing and distance detection signals, accesses map data stored in a storage medium such as a CD-ROM or the like, and superposes the vehicle position on a map in the vicinity of the detected present vehicle position so as to be displayed on a display unit. Further, the navigation system is intended to search the optimum route through a road network data base when an intended place or a destination is inputted and guide a driver with voices or by a display or the like.

Thus, by using the conventional navigation system the driver can easily recognize the present position of the vehicle at all times even in the case of a strange or unfamiliar place and can accurately reach the destination through the optimum route. In an unfamiliar area, the driver often does not know changes in the road such as a curved portion or a refracted portion which need abrupt steering. The driver can recognize such road changes by visually checking a map displayed on the display unit. However, a problem arises that when the driver operates the vehicle while visually checking the display unit at all times during driving, in that the power of attention to an actual frontal road is reduced and there is a risk of causing accidents.

SUMMARY OF THE INVENTION

It is therefore an object of the present invention to provide a navigation system capable of notifying the driver of a section in which the orientation of a road ahead of a vehicle is abruptly changed, so as to support safe driving.

It is another object of the present invention to provide a navigation system capable of unerringly deciding which roads ahead of the present position of a vehicle present route most suitable for a destination.

It is a further object of the present invention to provide a navigation system capable of holding data about a road ahead of a vehicle in less storage capacity.

It is a still further object of the present invention to provide a navigation system capable of easily detecting a section in which a road ahead of a vehicle changes.

It is a still further object of the present invention to provide a navigation system capable of accurately detecting road shapes within a section in which a road ahead of a vehicle changes.

According to one aspect of the present invention, for achieving the above objects, there is provided a navigation system comprising an operation unit for inputting a departure position of a vehicle, a unit for detecting the present position of a vehicle from the amount of change in bearing of the vehicle and a distance traveled by the vehicle from the departure position, a first storage unit for storing map data about a road therein, a second storage unit for reading a road existing ahead of the present vehicle position detected by the vehicle position detecting unit from the map data, and storing the result of reading therein, a unit for detecting a change-in-road section in which the orientation of the road greatly varies, from the forward road data stored in the second storage unit and judging whether the change-in-road section exists within a range in which a notification is required, and a notification unit for notifying the present vehicle position detected by the vehicle position detecting unit and the change-in-road section in which the notification has been judged necessary by the change-in-road detecting unit.

As regards the operation, the second storage unit reads a road existing ahead of the present vehicle position detected by the vehicle position detecting unit from map data, based on the present vehicle position detected and stores it therein as data. The change-in-road detecting unit detects a change-in-road section from the forward road data stored in the second storage unit and judges whether or not the change-in-road section exists within a range in which a notification is necessary. Thus, the notification unit can notify a section in which a road ahead of the vehicle varies, to a driver, thereby making it possible to make an improvement in driving safety.

Preferably, the second storage unit converts data about a road ahead of the present vehicle position to a series or string of shape sign data and stores it therein. It is thus possible to store the data about the road ahead of the vehicle in less storage capacity.

Further, preferably, the change-in-road detecting unit determines curvatures at a plurality of points on the frontal road from the frontal or forward road data represented as the shape sign data string to detect a change-in-road section. Each curvature is obtained by, for example, setting three points P, Q and R arranged in order at regular intervals along the frontal road data represented as the shape sign data string and calculating an angle formed by a vector PQ and a vector QR. As a result, the section in which the road ahead of the vehicle varies, can be easily detected.

More preferably, the change-in-road detecting unit judges that the change-in-road section has been detected when one of the curvatures exceeds a predetermined threshold value. Alternatively, the change-in-road detecting unit may determine a peak value of a curvature, set a threshold value according to the determined peak value and judge that the change-in-road section has been detected when the curvature exceeds the predetermined threshold value. Thus, the change-in-road section can be accurately detected according to the shape of the section in which the road ahead of the vehicle changes.

Still more preferably, the change-in-road detecting unit calculates a radius of curvature using the maximum value of the curvatures relative to the detected change-in-road section. As an alternative, the change-in-road detecting unit may calculate a radius of curvature using an average value of the curvatures relative to the detected change-in-road section. Thus, the contents corresponding to the radius of curvature can be notified. Further, the change-in-road section is notified to a driver with voices or by a screen display, and the speed of a vehicle and the detected radius of curvature of change-in-road section are taken into consideration. If necessary, control for reducing the vehicle speed before the change-in-road section, for example, can be performed by a running control system.

According to preferred embodiments, the operation unit includes a unit or section for inputting a destination. Further, a route searching unit for searching the optimum route from the input departure position and destination is included in the navigation system. The second storage unit reads road data corresponding to a route searched by the route searching unit from the first storage unit, based on the present vehicle position detected by the vehicle position detecting unit and the searched route and stores data about a road existing ahead of the present vehicle position therein. Thus, a change in the road ahead of the vehicle can be faithfully detected and displayed, thereby making it possible to make a further improvement in driving safety.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 3 shows examples of shape sign data, in which

DETAILED DESCRIPTION OF THE PREFERRED EMBODIMENTS

Figure 1:
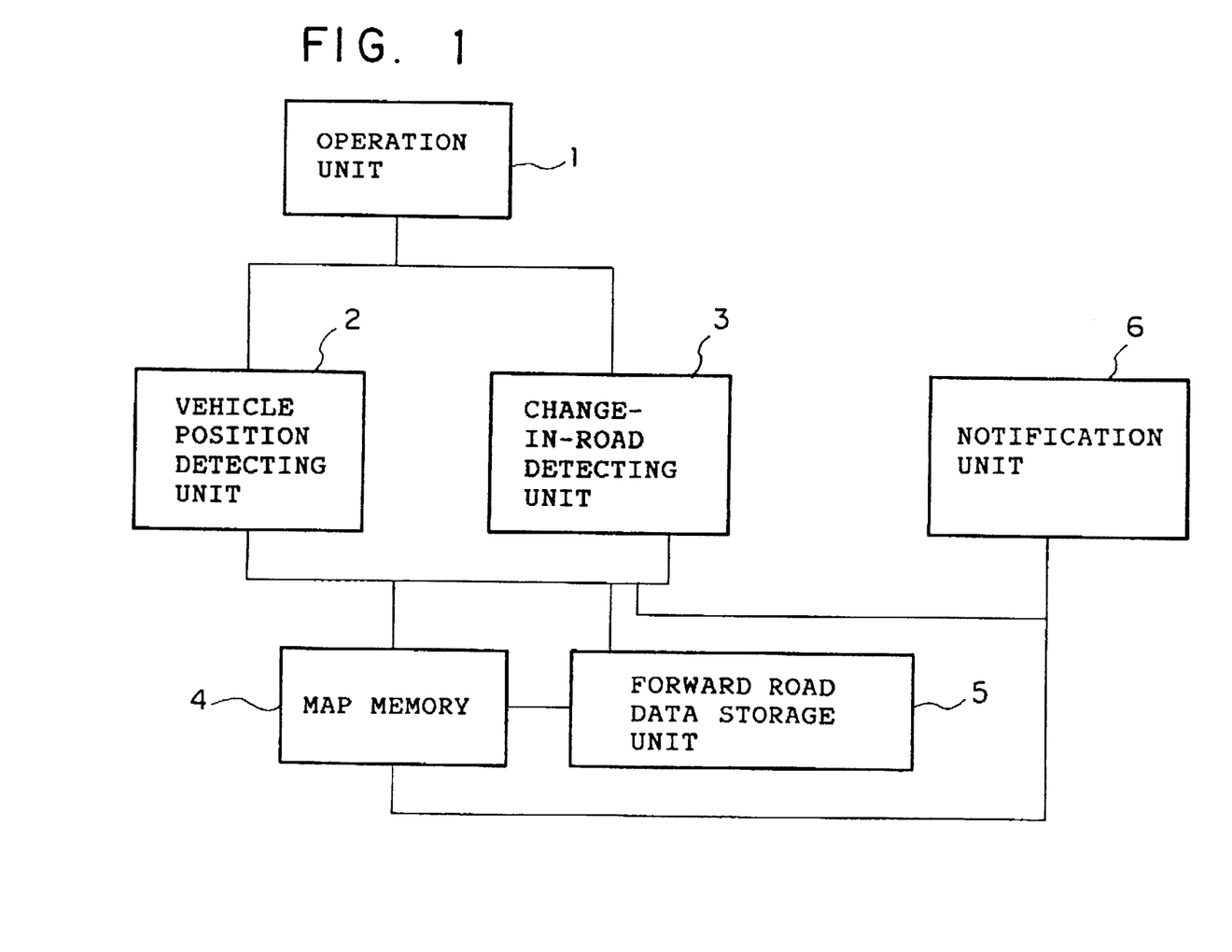
FIG. 1 is a block diagram showing the structure of a navigation system according to one embodiment of the present invention.

FIG. 1 is a block diagram showing the structure of a navigation system according to one embodiment of the present invention. In FIG. 1, there are shown a control or operation unit 1 for setting the present position of a vehicle and inputting various data, a vehicle position detecting unit 2 for detecting a vehicle position according to matching with a distance sensor or a bearing sensor or map data to be described later, a change-in-road detecting unit 3, a map storage medium 4 such as a CD-ROM or a magnetic tape for storing map data therein, a forward road data storage unit 5 for reading data about a road ahead of the vehicle from the map data stored in the map storage medium 4, converting the read data to shape sign data and storing it therein, and a notification unit 6 for notifying the present vehicle position detected by the vehicle position detecting unit 2 and a change in road existing ahead of the vehicle, which is obtained by the change-in-road detecting unit 3, to a driver in the form of voices or a display or the like.

A basic operation of the present embodiment will now be described below. The vehicle position detecting unit 2 detects the present position of a vehicle by utilizing dead reckoning using a distance sensor and a bearing sensor or by utilizing the dead reckoning, map matching and a GPS or the like in combination. The forward road data storage unit 5 reads data abut the road ahead of the present vehicle position from the map storage medium 4 based on the present vehicle position detected by the vehicle position detecting unit 2, converts the read road data into shape sign data and stores the result of conversion therein. On the other hand, the change-in-road detecting unit 3 detects a change in road (such as a curved portion or a refracted portion where a driver needs abrupt steering) based on the shape sign data stored in the forward road data storage unit 5. The notification unit 6 notifies the road change and the present position of the vehicle detected by the change-in-road detecting unit 3 to the driver through voices or a display or the like.

Figure 2:
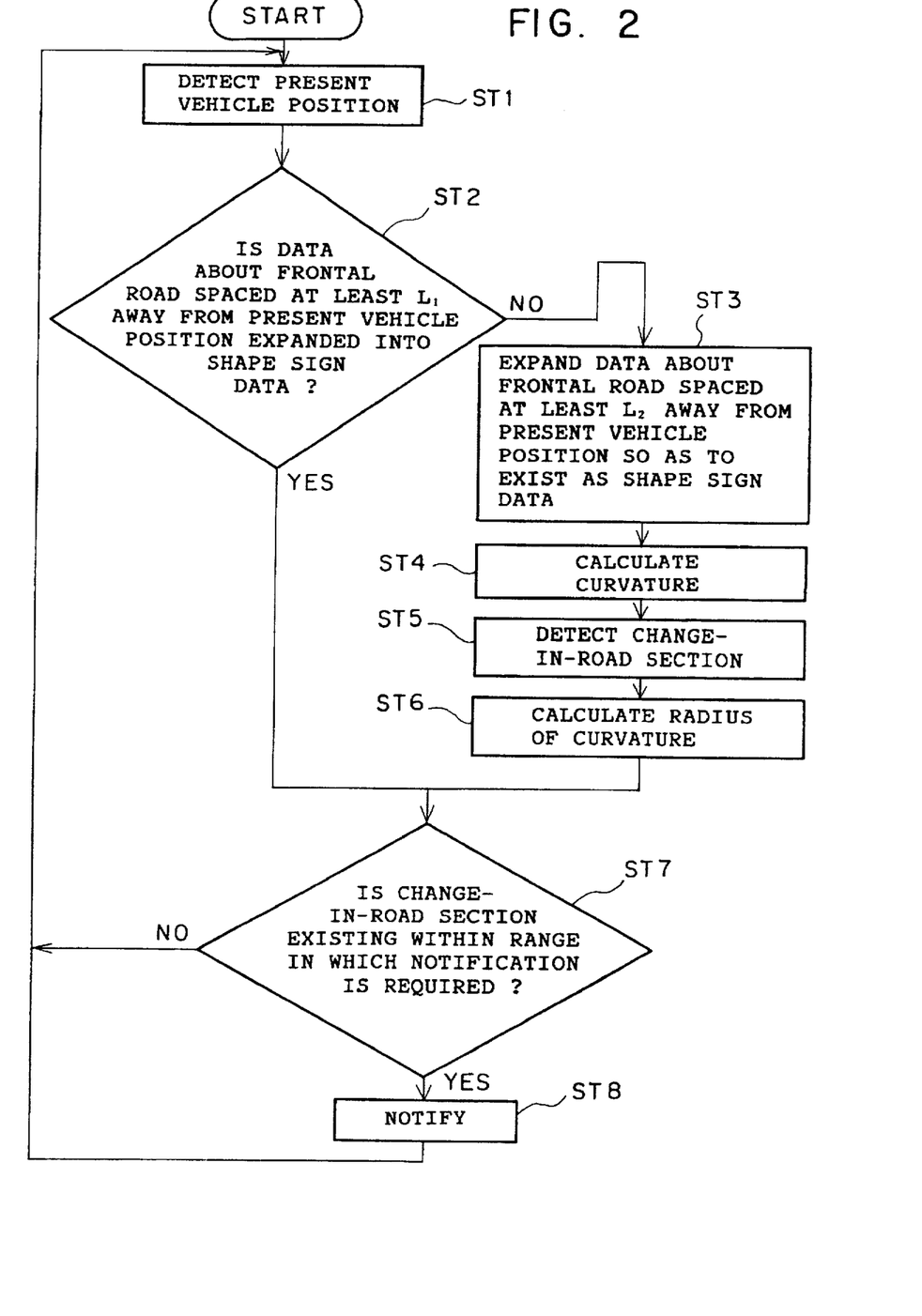
FIG. 2 is a flowchart for describing an operation for detecting a change-in-road section ahead of a vehicle.

One example of a method of detecting a change in road by using the change-in-road detecting unit 3 will be described below with reference to a flowchart shown in FIG. 2. First of all, the present position of a vehicle is detected by the vehicle position detecting unit 2 (Step ST1). Such a vehicle present-position detecting method is of one using a GPS satellite, which has been disclosed in Japanese Patent Laid-Open No. 63-171377, for example or one disclosed in Japanese Patent Laid-Open No. 63-148115 wherein the present position of a vehicle is detected through a distance sensor, a bearing sensor and map data. This method includes the function of obtaining the absolute position of the present vehicle location, e.g., a latitude and a longitude thereof.

The change-in-road detecting unit 3 shown in FIG. 1 obtains access to the forward road data storage unit 5 shown in FIG. 1 and judges or determines, on the basis of the present vehicle position detected in Step ST1, whether data about a road farther forward by at least a predetermined distance (L1) than the present vehicle position has been stored in the forward road data storage unit 5 shown in FIG. 1 in the form of shape sign data. Described specifically, the change-in-road detecting unit 3 normally makes a decision as to whether data about a frontal road spaced at least the predetermined distance (L1) or more away from the position of the vehicle is developed or expanded into shape sign data within the forward road data storage unit 5 each time the present position of the vehicle is brought up to date, i.e., the forward road data converted into the shape sign data includes data about a frontal road spaced at least the predetermined distance (L1) away from the present position of the vehicle (Step ST2).

Figure 5:
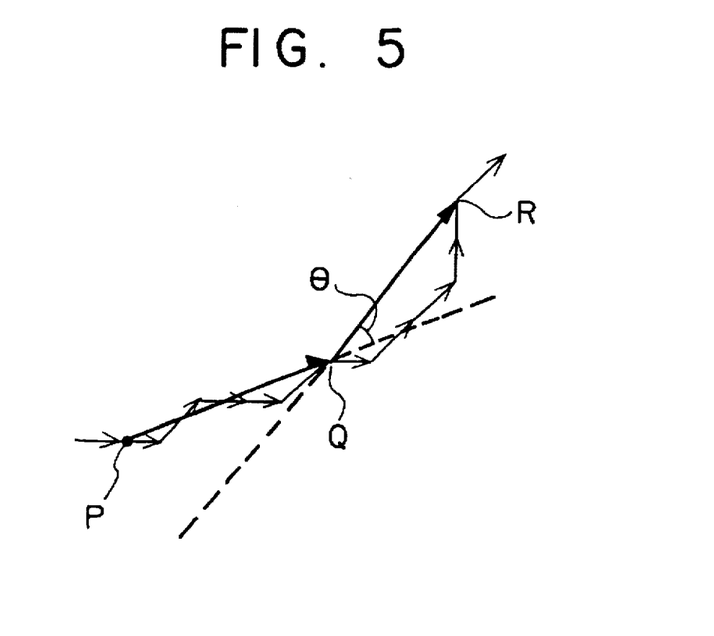
FIG. 5 is a view for explaining how to determine a curvature.

If the distance of a road or section farther forward than the present position of the vehicle, which is equivalent to frontal or forward road data (expanded into the shape sign data) stored in the forward road data storage unit 5 shown in FIG. 5, is shorter than L1 (if the answer is NO in Step ST2), then the change-in-road detecting unit 3 shown in FIG. 1 makes a request to the forward road data storage unit 5 in such a manner that the forward road data storage unit 5 stores shape sign data about a road forward by at least a constant distance (L2, where L1<L2) from the vehicle position therein as forward road data. The forward road data storage unit 5 shown in FIG. 1 obtains access to the map storage medium 4 shown in FIG. 1 from the present vehicle position obtained by the vehicle position detecting unit 2, develops or expands forward road data into shape sign data up to over L2 with the present position of the vehicle as a reference and stores it therein.

Figure 3A:
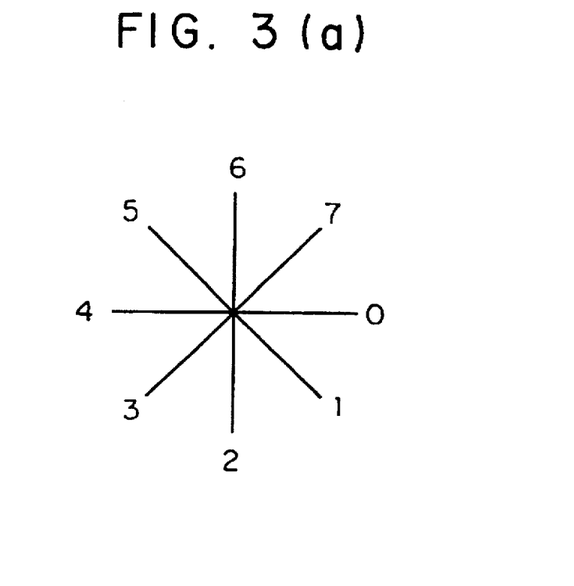
FIG. 3(a) is a view for describing a series of eight-directional chain signs and FIG. 3(b) is a table chart for describing the amounts of changes in chain signs in X and Y directions.
Figure 3B:
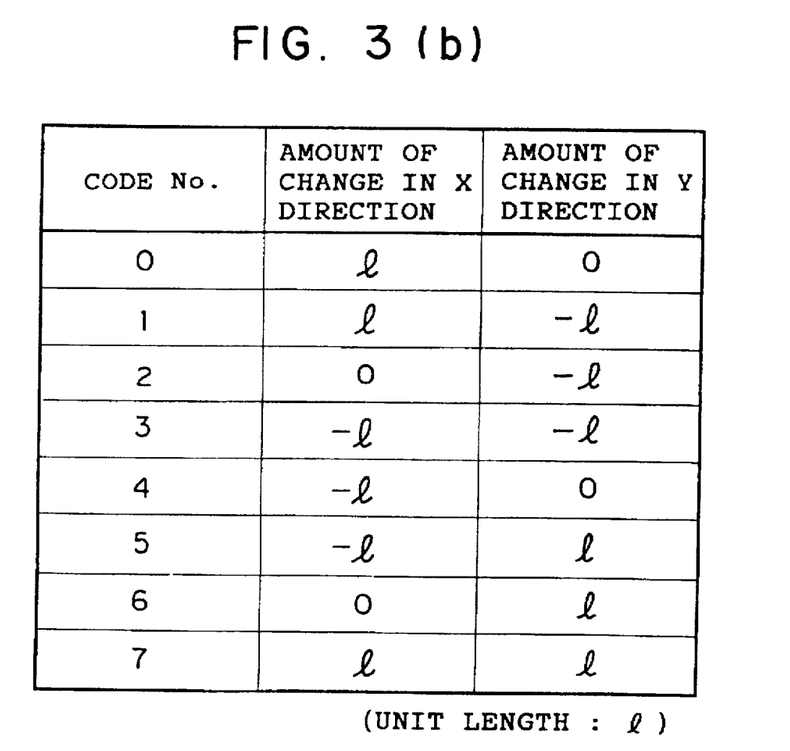
Figure 4:
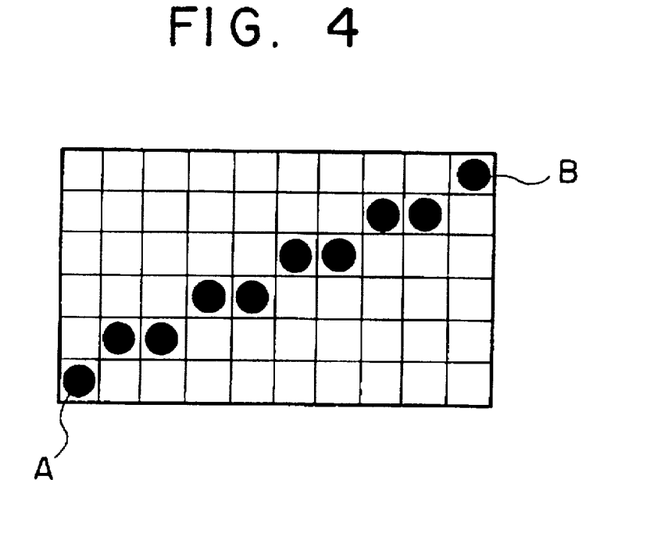
FIG. 4 is a view for describing forward road data represented in the form of shape sign data.

Assuming now that eight-directional chain signs are used as shape sign data provided that a unit length shown in FIG. 3(a) is "1", road shapes are represented in the form of a series of one-dimensional signs and the amounts of changes in chain signs in X and Y directions are easily understood. Road shape data will be regarded as have been stored in the forward road data storage unit 5 in the form of a series of chain signs equivalent to the series of one-dimensional signs, e.g., (7, 0, 7, 0, 7, 0, 7, 0, 7) as shown in FIG. 3(b)

together with data showing a corresponding relationship between code Numbers and the amounts of changes in the chain signs in the X and Y directions. FIG. 4 shows images of road shapes represented in the form of the series of chain signs (Step ST3).

Next, the change-in-road detecting unit 3 has access to the forward road data storage unit 5 to calculate a curvature from the forward road data represented in the form of the chain signs (Step ST4). According to the curvature calculating method, three points P, Q and R respectively spaced a distance L away from each other along the road data are considered and an angle $\theta$ (called "curvature") formed by the vectors PQ and QR is determined as shown in FIG. 5, for example. By the way, since the unit length of each chain sign is "1", the distance L can be represented as L=1×n (where n: the number of chain signs).

One example of how to determine the angle $\theta$ (curvature) formed by the vectors PQ and QR when N=5 will be described using FIG. 5. The vector between the points P and Q shown in FIG. 5 is represented by chain signs (0, 7, 0, 0, 7) and the vector between the points Q and R is represented by chain signs (0, 7, 7, 6, 6). The amounts of changes in the chain sign 0 in the X and Y directions are respectively 1 and 0, the amounts of changes in the chain sign 7 in the X and Y directions are respectively 1 and 1 and the amounts of changes in the chain sign 6 in the X and Y directions are respectively 0 and 1 (They are clearly understood from the table chart shown in FIG. 3(b), which describes the amounts of changes in the chain signs 0 to 7 in the X and Y directions). Since the amounts of changes in the vector PQ in the X and Y directions are respectively 5×1 and 2×1 (the amount of change in the vector PQ in the Y direction 2 with respect to the amount of change in the vector PQ in the X direction 5) and the amounts of changes in the vector QR in the X and Y directions are respectively 3×1 and 4×1 (the amount of change in the vector QR in the Y direction 4 with respect to the amount of change in the vector QR in the X direction 3), a bearing (x1) of the vector PQ becomes 22 degrees and a bearing (x2) of the vector QR becomes 53 degrees if the bearing of a vector is considered provided that the positive direction of an x axis is 0 degree and a counterclockwise bearing is made positive. Thus, the curvature $\theta$ between P and R becomes equal to x2−x1=31 degrees. By moving such points P, Q and R along shape sign data (chain signs), the curvature $\theta$ at each point on the shape sign data can be determined.

Next, the change-in-road detecting unit 3 detects a change-in-road section, i.e., a curved portion or a refracted portion of a road from the process of a change in the curvature $\theta$ determined in the above-described manner. In the case of a portion such as a linear portion, which is free of a change in road, the curvature $\theta$ is nearly zero, whereas the curvature of a road changes according to a concave function as the road changes.

Figure 6A:
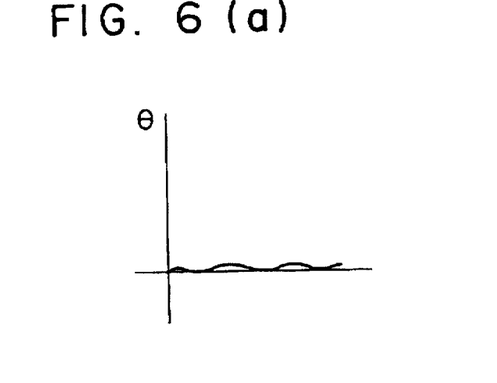
FIGS. 6(a) through 6(c) are respectively views showing changes in curvature according to the shape of a road.
Figure 6B:
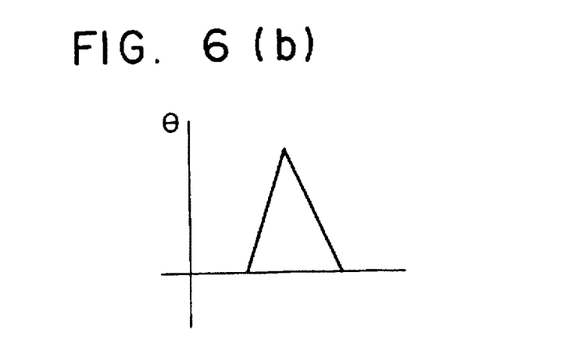
Figure 6C:
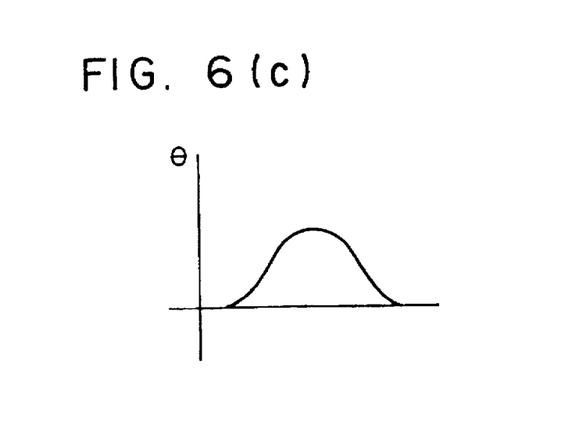

FIGS. 6(a) to 6(c) respectively show examples of curvatures calculated by the above method or the like, which vary according to the movement of a vehicle on a linear portion, a refracted portion and a curved portion of a road. In the drawings, the axis of abscissas represents the position of the vehicle in the change-in-road section and the axis of ordinates represents the curvature. FIG. 6(a) shows a change in curvature at the linear portion, FIG. 6(b) illustrates a change in curvature at the refracted portion and FIG. 6(c) depicts a change in curvature at the curved portion. As shown in FIG. 6(a), the curvature remains nearly zero even when the vehicle moves along the linear portion. As shown in FIG. 6(b) as well, the curvature abruptly increases when the vehicle approaches the refracted portion, whereas the curvature abruptly decreases when the vehicle is kept away from the refracted portion. The peak of the curvature appears in the vicinity of the refracted portion as a matter of course. As shown in FIG. 6(c) in contrast to the above, the curvature starts to gradually increase when the vehicle approaches the curved portion and the curvature reaches a maximum at the most curved portion. Further, the curvature gradually decreases as the vehicle is far off from the curved portion. The more the angle of refraction of the refracted portion increases and the radius of rotation of the curved portion decreases, the larger the peak value of the curvature $\theta$ in each of FIGS. 6(b) and 6(c) becomes. Further, the longer the change-in-road section is made (bent section and curved section are made long), the wider the base or bottom of the concave portion becomes.

By making use of the above property of curvature and detecting the concave portion whose curvature greatly varies, a change-in-road section is detected. Described specifically, when the curvature $\theta$ of a point on a forward road becomes larger than a given value ($\theta$s) in the process of computing the curvature along the road, it is judged or determined that the change-in-road section (bent portion or curved portion) begins at the point. Further, when the curvature $\theta$ of another point becomes smaller than a given value ($\theta$e) after the change-in-road section has been started, it is determined that the change-in-road section ends at the other point. Thus, the change-in-road section is detected based on the result of determination (Step ST5). Next, the change-in-road detecting unit 3 calculates a radius of curvature of the detected change-in-road section. The radius of curvature is calculated using the maximum value of curvature of the change-in-road section detected in Step ST5 (Step ST6).

Next, the change-in-road detecting unit 3 makes a decision as to whether there exists a change-in-road section detected in Step ST5 which is included within a range in which a notification is necessary. The change-in-road detecting unit 3 judges whether or not a change-in-road section exists within a close range that needs a notification based on the present position of the vehicle, for example (Step ST7). If the answer is YES in Step ST7, then the change-in-road detecting unit 3 specifies the corresponding change-in-road section and requires the notification unit 6 to notify the corresponding change-in-road section. The notification unit 6 notifies the driver of the change-in-road section detected by the change-in-road detecting unit 3 in the form of a voice message indicative of "Curve will come out", for example (Step ST8).

Figure 7:
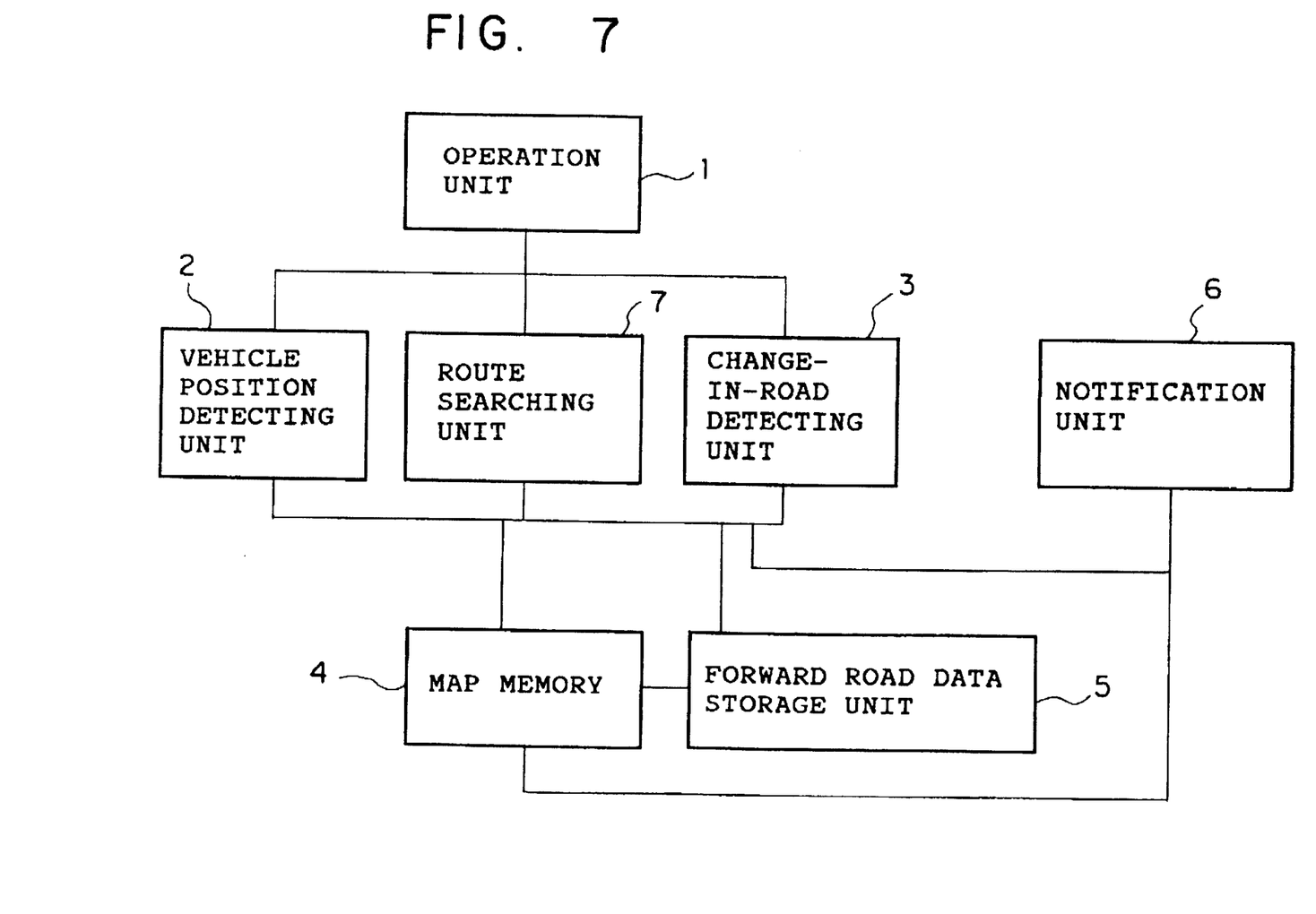
FIG. 7 is a block diagram showing the structure of a navigation system according to another embodiment of the present invention.

FIG. 7 is a block diagram showing the structure of a navigation system according to another embodiment of the present invention. In FIG. 7, the same elements as those shown in FIG. 1 are identified by like reference numerals and the description of certain common elements will therefore be omitted. When branch roads normally exist in the direction in which the vehicle travels, it is impossible to specify one of them. However, there is a high possibility that the vehicle runs on the optimum route searched based on the departure position and destination inputted from the operation unit.

Thus, a route searching unit 7 for searching the optimum route is provided in the present embodiment. Further, a map is loaded from the map storage medium 4 based on a route searched by the route searching unit 7 and the present vehicle position detected by the vehicle position detecting unit 2 and a decision is made as to whether a change-in-road section exists ahead of the vehicle by referring to the map.

It is therefore possible to faithfully detect and display a change in the road ahead of the vehicle.

Incidentally, threshold values (θs and θe in the aforementioned embodiment) for detecting a change-in-road section are set as fixed values. However, the accuracy of detecting the change-in-road section can be improved by determining a peak value of a curvature θ and setting threshold values θs and θe (such as the peak value of curvature±Δθ) as threshold values according to the shape of a change-in-road section expected from the peak value.

Further, in the aforementioned embodiment, the radius of curvature is determined using the maximum value of the change-in-road section. However, the average value of curvatures of the change-in-road section may be used as the radius of curvature. Alternatively, either one of the maximum curvature of the change-in-road section and the average curvature of the change-in-road section may be selected according to the shape of the change-in-road section.

In the aforementioned embodiment, the chain signs each indicated by the unit length of "1" with 8 resolution are used as shape sign data. However, the shape of a road farther forward than the vehicle can be faithfully represented and the accuracy of the radius of curvature can be improved by changing the resolution or the unit length "1".

The method of notifying each change-in-road section is not necessarily limited to the above-described method. This notification may be performed with a display or voices, for example. When determining the curvature θ of a change-in-road section, a distinction can be made between orientations (such as a right curve and a left curve) of the change-in-road section by respectively representing a change in clockwise bearing and a change in counterclockwise bearing as − and +, for example. Thus, the contents corresponding to the detected orientation of change-in-road section and the determined radius of curvature can be notified. When it is desired to notify the contents with voices, notifications such as "right curve will come out ahead", "sharp curve will come out ahead", etc. are considered. On the other hand, in the case of a display notification, it is considered that the orientation of a change-in-road section is clearly displayed on the screen of a CRT or the like.

In the above embodiment, the gentleness and sharpness of a detected change-in-road section are determined by actually calculating the radius of curvature. Since, however, the gentleness and sharpness of the change-in-road section can be judged even from the lengths L of the vectors PQ and QR and values θ of curvature, the gentleness and sharpness of the change-in-road section may be distinguished from each other and notified by being set to several levels from the relationship between L and θ.

When the vehicle is running at a low speed or is driving along an expressway, for example, a driver often feels the unnecessity of notifying a change-in-road section. It may therefore be judged based on an operation signal or a vehicle speed signal generated from the operation unit 1 whether a change-in-road section should be notified according to a vehicle running state.

Since the distance between the present position of the vehicle and a change-in-road section is easily obtained by searching shape sign data or actually accessing map data, the timing for notifying the change-in-road section may be provided when the present position of the vehicle approaches a predetermined distance Xm before the change-in-road section, for example. As the way of setting the predetermined distance Xm before the change-in-road section, there are various setting ways. For example, a fixed value may be set as this distance. Alternatively, this distance may be set according to the vehicle speed, the gentleness and sharpness of the change-in-road section, the width of the road, etc.

In the aforementioned embodiment, one kind of length L is used as the length (L in the above embodiment) of each of the vectors PQ and QR set when the change-in-road section is extracted by the change-in-road detecting unit 3. However, the optimum length L may be set as the length of each vector according to the shape of the change-in-road section. Namely, since a relatively short length L is suited for use within an abrupt change-in-road section whereas a relatively long L is suited within a gentle change-in-road section, a plurality of lengths L may be set depending on a radius of curvature that one desires to detect.

Further, if necessary, control for reducing the vehicle speed before a change-in-road section, for example, may be performed by a driving control system in consideration of the speed of a vehicle and the detected radius of curvature of change-in-road section in addition to the notification to the driver with voices or by a screen display.

As has been described above, the present invention can bring about many advantageous effects as follows:

Since a navigation system according to the present invention detects a change-in-road section existing in a vehicle traveling direction in advance and notifies the result of detection to a driver, the driver does not need to drive while visually checking a display unit at all times even when the driver is driving along a strange or unfamiliar place, thereby making it possible to lessen the risk of causing accidents.

Since the navigation system according to the present invention reads road data corresponding to a route most suitable for the destination, which has been detected by a route searching unit, based on the present vehicle position detected by a vehicle position detecting unit and the most suitable route, stores a road existing ahead of the present position of the vehicle therein as data, detects a change-in-road section from the road data and makes a decision as to whether or not the change-in-road section exists within a range in which a notification is required, a change in the road ahead of the vehicle can be faithfully detected and displayed, thereby making it possible to make a further improvement in driving safety.

Since the navigation system converts data about a road ahead of the position of a vehicle to shape sign data and stores it therein, the road data can be stored in less storage capacity.

Since the navigation system determines a curvature from forward road data represented as shape sign data to detect a change-in-road section, a change-in-road section existing ahead of a vehicle can be easily detected.

Since the navigation system sets a plurality of threshold values for detecting change-in-road sections and selects either one of the threshold values according to the gentleness and sharpness of each change-in-road section, the shape of a change-in-road section existing ahead of a vehicle can be accurately detected.

Having now fully described the invention, it will be understood that the invention can be constructed by different embodiments of the invention in its broader aspect without departing from the spirit and scope of the invention as set forth herein. It should be borne in mind that the invention is not limited to specific embodiments as regards other than those set forth in the appended claims.

What is claimed is:

1. A navigation system mounted on a vehicle, comprising:

operating means for inputting a departure position of the vehicle;

means for detecting a present position of the vehicle from an amount of change in bearing of the vehicle and a distance traveled by the vehicle from the departure position;

first storing means for storing map data about roads;

second storing means for reading information from the map data of a road existing ahead of the present position of the vehicle detected by said vehicle position detecting means, converting said information to a string of shape sign data, and storing the result therein as forward road data in the form of shape sign data;

means for detecting a change-in-road section in which a road orientation greatly varies, from the forward road data stored in said second storing means, by calculating curvatures at points on the road ahead from said forward road data to detect the change-in-road section and judging whether the change-in-road section exists within a range in which a notification is required; and notifying means for notifying the operator of the vehicle when the notification has been judged necessary by said change-in-road detecting means.

2. The navigation system as claimed in claim 1, wherein said operating means includes means for inputting a destination, said navigation system further including route searching means for searching an optimum route from the input departure position and destination and wherein said second storing means reads road data corresponding to the route searched by said route searching means from said first storing means, based on the present vehicle position detected by said vehicle position detecting means and the searched route and stores information representing a road existing ahead of the present position of the vehicle therein.

3. The navigation system as claimed in claim 1, wherein said change-in-road detecting means judges that the change-in-road section has been detected when one of the curvatures exceeds a predetermined threshold value.

4. The navigation system as claimed in claim 1, wherein said change-in-road detecting means determines a peak value of one of the curvatures, sets a threshold value according to the determined peak value and judges that the change-in-road section has been detected when said one curvature exceeds the predetermined threshold value.

5. The navigation system as claimed in claim 1, wherein said change-in-road detecting means includes means for calculating a radius of curvature using the maximum value of the curvatures relative to the detected change-in-road section.

6. The navigation system as claimed in claim 1, wherein said change-in-road detecting means includes means for calculating a radius of curvature using an average value of the curvatures relative to the detected change-in-road section.

7. The navigation system as claimed in claim 1, wherein said change-in-road detecting means sets three points P, Q and R arranged in order at regular intervals along the forward road data represented as the shape sign data string, calculates an angle formed by a vector PQ and a vector QR as one of the curvatures and determines the curvatures at the plurality of points by successively shifting the three points.

8. The navigation system as claimed in claim 2, wherein said change-in-road detecting means judges that the change-in-road section has been detected when one of the curvatures exceeds a predetermined threshold value.

9. The navigation system as claimed in claim 2, wherein said change-in-road detecting means determines a peak value of one of the curvatures, sets a threshold value according to the determined peak value and judges that the change-in-road section has been detected when said one curvature exceeds the predetermined threshold value.

10. The navigation system as claimed in claim 2, wherein said change-in-road detecting means includes means for calculating a radius of curvature using the maximum value of the curvatures relative to the detected change-in-road section.

11. The navigation system as claimed in claim 2, wherein said change-in-road detecting means includes means for calculating a radius of curvature using an average value of the curvatures relative to the detected change-in-road section.

12. The navigation system as claimed in claim 2, wherein said change-in-road detecting means sets three points P, Q and R arranged in order at regular intervals along the forward road data represented as the shape sign data string, calculates an angle formed by a vector PQ and a vector QR as one of the curvatures and determines the curvatures at the plurality of points by successively shifting the three points.

13. The navigation system as claimed in claim 1, further comprising a speedometer for measuring the vehicle speed and outputting said speed to said means for detecting, wherein said means for detecting analyzes the vehicle speed when judging whether said notification is necessary.

14. The navigation system according to claim 1, wherein said shape sign data comprises a string of codes, each of said codes defining a two-dimensional change in position based upon a scalar value for each dimension, said scalar value being one of a positive unit-length, a negative unit-length, and zero.

* * * * *